United States Patent
Hohl et al.

(10) Patent No.: US 6,825,238 B2
(45) Date of Patent: Nov. 30, 2004

(54) LOW ACID ORGANOMETALLIC CATALYST FOR THE PRODUCTION OF FLEXIBLE, SEMI-FLEXIBLE AND RIGID POLYURETHANE FOAMS

(75) Inventors: Peter Charles Hohl, Hamburg, PA (US); Lisa Ann Mercando, Pennsburg, PA (US); James Douglas Tobias, Centervalley, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 10/353,642

(22) Filed: Jan. 29, 2003

(65) Prior Publication Data

US 2004/0147626 A1 Jul. 29, 2004

(51) Int. Cl.⁷ .................................................. C08J 9/04
(52) U.S. Cl. .................... 521/123; 521/124; 521/128; 521/129; 521/170; 521/174
(58) Field of Search ..................... 521/124, 128, 521/129, 170, 174

(56) References Cited

U.S. PATENT DOCUMENTS

| | | |
|---|---|---|
| 4,105,595 A | 8/1978 | Eisenmann et al. |
| 4,200,699 A | 4/1980 | Treadwell ............ 521/124 |
| 4,256,847 A | 3/1981 | Spector .............. 521/117 |
| 4,256,848 A | 3/1981 | Brizgys et al. ........ 521/124 |
| 5,342,859 A | 8/1994 | Blanpied et al. ....... 521/125 |
| 6,005,016 A * | 12/1999 | Nodelman et al. ...... 521/164 |
| 6,107,355 A | 8/2000 | Horn et al. ........... 521/51 |
| 6,242,555 B1 | 6/2001 | Du Prez et al. ........ 528/52 |
| 6,590,057 B1 * | 7/2003 | Brecht et al. ......... 528/52 |

FOREIGN PATENT DOCUMENTS

| | | |
|---|---|---|
| EP | 0 603 597 A1 | 6/1994 |
| GB | 1000084 A | 8/1965 |
| GB | 1258357 A | 12/1971 |

OTHER PUBLICATIONS

Arenivar, J.D., "Bismuth Carboxylates for Polyurethane Catalysis," Polyurethanes, 89, Proceedings of the SPI 32$^{nd}$ Annual Technical/Marketing Conference, Oct. 1–4, 1989, pp. 623–627.

J. D. Arenivar, "Bismuth Carboxylates for Polyurethane Catalysis," 32$^{nd}$ Annual Polyurethane Technical/Marketing Conference (1989).

European Search Report No. 04001660.2–2115, dated May 17, 2004.

* cited by examiner

*Primary Examiner*—John M. Cooney, Jr.
(74) *Attorney, Agent, or Firm*—Michael Leach

(57) ABSTRACT

The present invention relates to an improvement in flexible, semi-flexible and rigid foams formed by the catalytic reaction of an aromatic polyisocyanate, a polyol and a blowing agent and a process for preparing such polyisocyanate. The improvement resides in using an effective amount of a bismuth carboxylate or bismuth sulfonate having less than 34% free acid as the catalyst.

22 Claims, No Drawings

LOW ACID ORGANOMETALLIC CATALYST FOR THE PRODUCTION OF FLEXIBLE, SEMI-FLEXIBLE AND RIGID POLYURETHANE FOAMS

BACKGROUND OF THE INVENTION

Polyurethane foams produced by the catalytic reaction of a polyisocyanate with a polyol in the presence of various blowing additives are widely known and used in fabricating parts and equipment for the automotive industry, as well as housing and other industries. One such blowing additive is a chlorofluorocarbon (CFC) blowing agent which vaporizes as a result of the reaction exotherm. The discovery that CFC's may deplete ozone in the stratosphere has resulted in mandates diminishing CFC use. Production of water-blown foams, in which blowing is performed with $CO_2$ generated by the reaction of water with the polyisocyanate, has therefore become increasingly important.

The production of rigid polyurethane foams is a well-known art, and as such, foams have a wide variety of industrial and commercial applications. Rigid polyurethane foams have been used as packaging materials, flotation materials and various structural components. Rigid polyurethane foam has one of the lowest thermal conductivity ratings of any insulant, which allows efficient retention of heat or, alternatively, maintenance of a refrigerated or frozen environment insulating rigid polyurethane foams may be molded into many useful appliances. The foams may be shaped into sheets of varying thickness and placed between roofs or in floors. They also may be formed into contour shapes useful in insulating pipes and ducts. Rigid polyurethane foam can also be applied to numerous substrates by spray foaming techniques. Spray foam applications are important particularly in such areas as warehouses, schools and offices providing the desired insulation requirements for heating and cooling.

Virtually all commercially manufactured polyurethane foams are made with the aid of at least one catalyst. Catalysts are those compounds that help promote the reaction between an isocyanate and an isocyanate-reactive compound. The types of catalysts that are typically utilized in the formation of rigid polyurethane foams may differ depending on application. The ability to selectively promote either the blowing reaction (reaction of water with isocyanate to generate CO2), the gelling reaction (reaction of polyol with isocyanate) or the trimer reaction (polymerization of isocyanate to form isocyanurate) is an important consideration in selecting the proper catalyst.

If a catalyst promotes the blowing reaction to a high degree, much of the CO2 will be evolved before sufficient reaction of isocyanate and polyol has occurred, and the CO2 will bubble out of the formulation, resulting in a foam of poor quality and physical properties. In contrast, if a catalyst too strongly promotes the gelling reaction, a substantial portion of the CO2 will be evolved after a significant degree of polymerization has occurred. This foam will typically be characterized by high density, broken or poorly defined cells, and/or other undesirable features. Finally, in those applications desiring the production of isocyanurate (trimer), if a catalyst does not generate enough heat (exothermic reaction) early on in the reaction, the amount of trimer that is produced will be low. Again, a poor quality foam, this time characterized by friability, poor dimensional stability and poor fire properties, will be produced.

The following patents and articles are representative of the art in the polyurethane industry:

U.S. Pat. No. 4,200,699 discloses the formation of rigid polyurethane foams using a catalytically effective amount of an antimony carboxylate, a potassium carboxylate, and a zinc carboxylate in combination with tertiary amines or tin compounds.

U.S. Pat. No. 5,342,859 discloses the use of alkali metal catalysts in the presence of excess carboxylic acid, e.g., 2-ethyl-hexoic acid to help improve the flame suppression of polyurethane foam by creating flame resistant amides. It also can help to reduce the water content of in polyurethane formation.

U.S. Pat. No. 6,107,355 discloses the use of alkali and alkaline earth metal salts of mono carboxylic acids to produce polyurethane foams. Cocatalysts consisting of tertiary amines may be used in conjunction with the metal salts.

U.S. Pat. No. 4,256,848 discloses the use of co-catalyst combinations comprised of divalent mono-mercuric salts of organic acids and ionizable mono-organo-mercuric carboxylates as catalysts for the preparation of polyurethanes including solid, non-cellular, and foam urethanes, both rigid and flexible.

U.S. Pat. No. 4,256,847 discloses a method for producing rigid polyurethane foams consisting of an organic polyisocyanate, an organic polyol, a blowing agent, and a catalyst. The catalyst suited for catalyzing the formation of polyurethanes consists of zinc or lithium salts of carboxylic acids.

U.S. Pat. No. 6,242,555 discloses the use of organo bismuth, organo tin and organo lead carboxylates as catalyst types for the production of micro-cellular or noncellular, light stable elastomeric isophorone diisocyanate based polyurethane moldings. Organobismuth carboxylates having less than 60% free acid, preferably less then 25% and most preferably, less than 10% are disclosed.

Arenivar, J. D., *Bismuth Carboxylates for Polyurethane Catalysts.*, Polyurethanes, 89, Proceedings of the SPI $32^{nd}$ Annual Technical/Marketing Conference, Oct. 1–4, 1989, pp 623–627 disclose the use of Bismuth Carboxylates for Polyurethane elastomers and the effect of added acid. Bismuth octoate and bismuth neodecanoate in the presence of 1–4 equivalents acid were disclosed as catalytic materials.

Although organometallic catalysts have found acceptance in many commercial coatings, adhesives, sealants, and elastomers (C.A.S.E.) applications, their use in urethane-based flexible and semi-flexible foams has been limited. Tertiary amines are currently the industry standard polyurethane foam catalyst, yet their distinct odor and volatility has had the industry searching for catalytic alternatives.

SUMMARY OF INVENTION

The present invention relates to an improvement in flexible, semi-flexible and rigid foams formed by the catalytic reaction of a reaction mixture comprised of an aromatic polyisocyanate, an organometallic catalyst, a polyol and a blowing agent. The improvement resides in a bismuth carboxylate or bismuth sulfonate having less than 34% free acid as the organometallic catalyst.

Several advantages can be achieved by the use of a bismuth carboxylate or bismuth sulfonate as the catalyst and these include:

an ability to produce flexible, semi-flexible and rigid foams of excellent quality;

an ability to produce a foam having an excellent low value of thermal conductivity;

an ability to produce a foam having essentially no odor; and,

DETAILED DESCRIPTION OF THE INVENTION

Low-density flexible, semi-flexible and rigid foams having a density of 1–5 pounds per cubic foot (pcf) are highly cross-linked polymers with a closed cell structure. Each cell within this polymeric matrix maintains a high percentage of unbroken cell walls so that gas diffusion, in and out of these cells, is very difficult. CFCs (chlorofluorocarbons), HCFCs (hydrochlorofluorocarbon), HFCs (hydrofluorocarbon), hydrocarbons or other auxiliary blowing agents are usually contained within these cells. Because these blowing agents tend to have much lower thermal conductivity than air, these rigid closed-cell foams have a significantly lower thermal conductivity than most other competitive insulative materials.

In attempts to further optimize this technology, a family of bismuth based catalysts have been identified that can, solely or in conjunction with tertiary amine catalysts, substantially reduce cell size and the k-factor (measure of thermodynamic properties—lower the better) in a rigid polyurethane foam formulated with water, CFCs, HCFCs, HFCs, or hydrocarbons as conventional blowing agents. This family of organometallic compounds has the general structure:

where $[M]^+$ corresponds to the tri-valent metal cation bismuth (Bi) and $[N]^-$ corresponds to the anions of any carboxylic or sulfonic acids. These catalysts can be used to promote the reaction, solely or in conjunction with a tertiary amine or other organometallic compound, between an aromatic isocyanate functional compound, i.e., MDI, TDI and an active hydrogen-containing compound e.g., a polyol, and amine or water especially the urethane (gelling) reaction of polyol hydroxyls with the isocyanate and the blowing reaction of water with isocyanate and/or the trimerization of the isocyanate functionality to form polyisocyanurates.

Examples of bismuth carboxylates and sulfonates include the carboxylates of $C_{515}$ aliphatic acids. Specifically the 2-ethyhexanoic acid (octoate) and neodecanoic acid. Examples of sulfonates include aromatic sulfonates such as p-toluenesulfonate and aliphatic sulfonates such as methanesulfonate and trifluoromethanesulfonate.

Examples of tertiary amines which can be utilized with the bismuth carboxylates and sulfonates include diazabicyclooctane (triethylenediamine), quinuclidine and substituted quinuclidines; substituted pyrrolizidines and substituted pyrrolidines; bisdimethylaminoethyl ether, pentamethyldiethylenetriamine, higher permethylated polyamines, branched polyamines, 2-[N-(dimethylaminoethoxyethyl)-N-methylamino]ethanol, alkoxylated polyamines, imidazole-boron compositions, and aminopropylbis(aminoethyl)ether compositions to produce flexible and rigid foams with enhanced foam physical properties without negatively impacting the existing foam processing properties (e.g. reactivity profile, line speed, mold temperature) of existing rigid polyurethane foam formulations.

Other tertiary amines suited for use with the bismuth carboxylates and sulfonates include mono-ureas and bis-ureas such as 2-dimethylaminoethyl urea; N,N'-bis(2-dimethylaminoethyl) urea; N,N-bis(2-dimethylaminoethyl) urea; 3-dimethyl-aminopropyl urea; N,N'-bis(3-dimethylaminopropyl) urea; N,N-bis(3-dimethylaminopropyl) urea; 1-(N-methyl-3-pyrrolidino)methyl urea; 1,3-bis(N-methyl-3-pyrrolidino)methyl urea; 3-piperidinopropyl urea; N,N'-bis(3-piperidinopropyl) urea; 3-morpholino-propyl urea; N,N'-bis(3-morpholinopropyl) urea; 2-piperidinoethyl urea; N,N'-bis(2-piperidinoethyl) urea; 2-morpholinoethyl urea; and N,N'-bis(2-morpholinoethyl) urea.

The level of bismuth catalyst employed for forming the polyurethane will range from 0.05 to 5 parts per hundred weight parts polyol (pphp), preferably 0.2 to 3 pphp (weight basis).

The level of amine will range from 0.055 pphp when the two are use in combination, the ratio of bismuth catalysts to the tertiary amine will range from approximately 1:10 to 10:1 (weight basis).

These flexible, semi-flexible and rigid polyurethane foam formulations are prepared using any suitable aromatic polyisocyanates well know in the art including, for example, phenyl diisocyanate, toluene diisocyanate (TDI) and 44'-diphenylmethane diisocyanates (MDI) with % NCO content typically ranging between 20 and 50. Suitable mixtures include 2,4- and 2,6-TDI's individually or together as their commercially available mixtures. Other suitable isocyanates are mixtures of diisocyanates known commonly as "crude MDI", which contain 4,4'-diphenylmethane diisocyanates along with other isomeric and analogous higher polyisocyanates. Also suitable are "prepolymers" of these polyisocyanate comprising a partially pre-reacted mixture of a polyisocyanate and a polyether or polyester polyol.

Illustrative of suitable polyols as a component of the polyurethane formulation are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, and like low molecular weight polyols. These polyether polyol derivations may be initiated with sucrose, glycerol, glycerine, aliphatic and aromatic amines, propylene glycol, Mannich bases, and/or sorbitol, individually or in combinations. Typical OH# values for these materials may range from 23–800.

In the practice of this invention, a single high molecular weight polyether polyol may be used. Also, mixtures of high molecular weight polyether polyols such as mixtures of di- and tri-functional materials and/or different molecular weight or different chemical composition materials may be used.

Useful polyester polyols include those produced by reacting a dicarboxylic acid with an excess of a diol, for example, adipic acid with ethylene glycol or butanediol, or reacting an anhydride with an excess of a diol, such as, phthalic anhydride with diethylene glycol or reacting a lactone with an excess of a diol such as caprolactone with propylene glycol. Typical hydroxyl number (OH#) values for these materials range from 160–490.

In addition to the polyether and polyester polyols and their combinations, the masterbatches, or premix compositions, frequently contain a polymer polyol. Polymer polyols are used in polyurethane foam to increase the foam's resistance to deformation, i.e., to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

Blowing agents such as water, methylene chloride, hydrochlorofluorocarbons, such as, trichlorofluoromethane and pentafluoropropane; hydrocarbons, liquid carbon dioxide and the like can be used in preparing the foam formulations.

Optionally, cell stabilizers such as silicones; chain extenders such as ethylene glycol and butanediol; and crosslinkers such as diethanolamine, diisopropanolamine, triethanolamine and tripropanolamine are employed in foam formulations.;

A general polyurethane rigid foam formulation having a 0.5–5.0 lb/ft$^3$ (8.0–80.2 kg/m$^3$) density containing a organometallic catalyst, composition according to the invention, would comprise the following components in parts by weight (pbw):

| Rigid Foam Formulation | Parts by Weight (pphp) |
|---|---|
| Polyol | 100 |
| Silicone Surfactant | 1–4 |
| Blowing Agent | 2–35 |
| Catalyst | 0.01–10 |
| Co-Catalysts | 0.01–10 |
| Water | 0–5 |
| Isocyanate Index | 70–300 |

A general polyurethane flexible foam formulation having a density of 1–3 lb/ft$^3$ (16–48 kg/m$^3$) (e.g., automotive seating) containing catalysts such as the bismuth carboxylate catalyst compositions according to the invention would comprise the following components in parts by weight (pbw):

| Flexible Foam | Parts by Weight (pphp) |
|---|---|
| Conventional Polyol (~5000 MW Triol) | 20–100 |
| Co-Polymer Polyol | 60–0 |
| Silicone Surfactant | 1–2.5 |
| Blowing Agent | 2–4.5 |
| Crosslinker | 0.5–3 |
| Catalyst | 0.1–10 |
| Isocyanate Index | 70–115 |

The term conventional polyol and polymer polyol is intended to refer to a polyol that is used as the base polyol for formulation of flexible molded foam. It is void of grafts using Styrene Acrylonitrile (SAN). A co-polymer is one that has SAN grated onto the conventional or base polyol. This helps to build load in the system.

The following examples are given to illustrate various embodiments of the invention and should not be interpreted as limiting in any way.

EXAMPLE 1

Comparison of Bismuth Octoate or Bismuth Neodecanoate Verses Tertiary Amine Catalysts in Rigid Foam Formation A conventional polyurethane foam was prepared using the formulation for an HCFC 141b Appliance Foam application listed below:

| Component | Parts by Weight (pphp) |
|---|---|
| Polyol Blend | 100.0 |
| Water | 2.0 |
| HCFC 141b | 370 |
| Catalyst | -Varied |
| DC 5700 | 3.0 |
| Polymeric MDI | 140 Index |

Polyol Blend - a conventional, proprietary polyol blend produced by Dow Chemical
Forane ® 141b - a conventional auxiliary HCFC blowing agent marketed by Elf Atochem.
Catalyst - See Table I
DABCO ® DC 5700 - a conventional silicone surfactant marketed by Air Products and Chemicals, Inc.
Polymeric MDI - a conventional polymeric diphenylmethane diisocyanate (MDI) marketed by Dow Chemical.

Machine scale testing was completed on the above-mentioned formulations using a Cannon Type A-40/20 high-pressure machine with a throughput of 25 to 30 lbs/min. The polyol, water, HCFC 141b, surfactant and catalysts were loaded into the resin day tank and agitated. The polymeric MDI was loaded into the isocyanate day tank. Both tanks were then pressured with nitrogen to keep constant head pressure throughout the experiment. The polymeric MDI was maintained at 85° F., while the resin was held constant at 80° F. Both the isocyanate-side and the resin-side pour pressures were maintained at 2000 psi throughout the experiment. Foams were set into a Lantzen panel mold (200 cm×20 cm×5 cm) at a constant temperature of 120° F. The foam was allowed to flow vertically in the Lantzen panel in order to measure flow and subsequent overall final foam density. In addition to minimum fill weights, various-over-packed foams were produced for physical testing (K-factor and average cell size count). The tertiary amine catalysts (PC5+PC41 vs. bismuth tris 2-ethylhexanoic acid (bismuth octoate) vs. bismuth tris neodecanoic acid (bismuth NDA) were compared at varying use levels, but all maintaining similar reactivity profiles (cream, string gel and tack free times).

Table I lists the final foam physical properties obtained using the catalysts PC5+PC 41, Bismuth Octoate, Bismuth Neodecanoate. In all cases, the foam reactivity was matched by monitoring free rise pours which allowed for the easy measurement of cream, string gel and tack free times. Free rise densities were also measured at this time. The foams tested met standard ASTM specifications, % Closed Cell—ASTM D 2856, Dimensional Stability—ASTM D 2126, K-Factor—ASTM C 177, Compressive Strength—ASTM D 1621. Cell size was determined with the aid of a Hitachi solid-state color video camera attached to a Nikon SMZ-2T microscope. Rigid samples were cut down to 0.25 in. widths and analyzed at 60× magnification.

TABLE I

| Catalyst | PC 5:PC 41 Amines | Bismuth Octoate | Bismuth NDA |
|---|---|---|---|
| Use Level parts per hundred parts polyol by weight (pphp) | 1.2:1.0 | 1.5 | 1.65 |
| Processing Conditions | | | |
| Iso. Temp. (° F.) | 85 | 85 | 85 |
| Resin Temp. (° F.) | 80 | 80 | 80 |
| Pour Pressure (Iso = Resin, psi) | 2000 | 2000 | 2000 |
| Mold Temperature (° F.) | 120 | 120 | 120 |
| Time to Demold (min.) | 3.0 | 3.0 | 3.0 |
| Reactivity | | | |
| Cream | 3.0 | 8.0 | 7.0 |
| String Gel | 27.0 | 32.0 | 35.0 |
| Tack Free | 44.0 | 45.0 | 44.0 |
| Min. Fill Density (pcf) | 1.87 | 1.85 | 1.88 |
| 24 hr K-factor | | | |
| (BTU · in/ft$^2$ · h · ° F.) | | | |
| Density = 2.0 | 0.132 | 0.123 | 0.123 |
| Density = 2.1 | 0.131 | 0.121 | 0.125 |
| Average Cell Size (microns) | 330 | 250 | 220 |
| % Closed Cell | 82 | 87 | 86 |

DABCO ® Polycat 41 - a conventional tertiary amine, i.e., tris (dimethylaminopropyl)triazine catalyst marketed by Air Products and Chemicals, Inc.
DABCO Polycat 5 - a conventional tertiary amine catalyst, i.e., (pentamethyldiethylenetriamine) marketed by Air Products and Chemicals, Inc.
Bismuth Octoate - supplied by Shepherd Chemical Company.
Bismuth Neodecanoate - supplied by Shepherd Chemical Company.

The data in Table I show that by using either bismuth octoate or bismuth neodecanoate in place of the standard tertiary amine catalysts (e.g. PC5 and PC 41), that it is possible to positively impact both the cell size and k-factor of the resulting foam without negatively impacting the existing processing conditions. K factor differences of 0.003 or greater are considered statistically significant, thus the bismuth results are substantially improved relative to the PC5/PC41 amine control run. Additionally, the data demonstrate that use of the metal carboxylates can lengthen the cream time without affecting the tack free time. This effectively translates to improved flow characteristics and better mold fill. The use of bismuth octoate or bismuth neodecanoate produces comparable reactivities at similar minimum fill densities to that of tertiary amines with the added benefit of a significantly reduced cell size.

EXAMPLE 2

Effect of Catalysts (PC 5/PC 41 vs. Bismuth Neodecanoate)

A conventional (rigid) spray polyurethane foam was prepared using the formulation listed below for the purpose of determining the effect of the catalysts (PC5+PC41 vs. bismuth NDA) at varying use levels, but maintaining similar reactivity profiles (cream, string gel and tack free times).

| Component | Parts by Weight (pphp) |
|---|---|
| Polyol Blend | 100.0 |
| Water | 0.40 |
| HCFC 141b | 21.0 |
| Catalyst | 0.1–1.0 |
| DC 193 | 2.0 |
| Polymeric MDI | 190 Index |

Polyol Blend - a conventional polyol blend marketed by Dow Chemical Corporation
Forane ® 141b - a conventional auxiliary HCFC blowing agent marketed by Elf Atochem.
Catalyst - See Table II
DABCO ® DC 193 - a conventional silicone surfactant marketed by Air Products and Chemicals, Inc.
Polymeric MDI - a conventional polymeric MDI marketed by Dow.

Machine scale testing was completed on the above-mentioned formulation using a Gusmer VH3000 high-pressure variable ratio spray machine with a throughput of 10 to 20 lbs/min. The Polyol, Water, HCHC 141b, surfactant and catalysts were loaded into the resin day tank and agitated. The polymeric MDI was loaded into the isocyanate day tank. Both tanks were then pressured with nitrogen to keep constant head pressure throughout the experiment. Both the isocyanate-side and the resin-side pour pressures were maintained at 1000 psi and sprayed through a Gusmer Model GX-7 spray Gun set-up with a # 1 module (Diameter=0.125 in.) and a 70 tip round spray pattern (pattern diameter=12 inches at 24 inches above substrate). Both the isocyanate and resin hose heaters were maintained at 80° F. Atmospheric conditions for the spray environment and substrate were maintained at 75° F. and 50% relative humidity by spraying inside a temperature and humidity controlled spray booth. The resulting polyurethane foam was sprayed onto standard cardboard that was conditioned inside the spray booth.

Table II lists the final foam physical properties obtained using the catalysts PC5+PC 41 and bismuth NDA. In all cases, the foam reactivity was matched by monitoring hand-mixed free rise pours which allowed for the easy measurement of cream, string gel and tack free times. Free rise densities were also measured at this time. The foams tested met standard ASTM specifications, % Closed Cell—ASTM D 2856, Dimensional Stability—ASTM D 2126, K-Factor—ASTM C 177, Compressive Strength—ASTM D 1621. Cell size was determined with the aid of a Hitachi solid-state color video camera attached to a Nikon SMZ-2T microscope. Rigid samples were cut down to 0.25 in. widths and analyzed at 60× magnification.

TABLE II

| Catalyst | PC5:/ DMEA | Bismuth Neodecanoate |
|---|---|---|
| Use Level (pphp) | 0.8:/ 3.0 | 1.2 |
| Reactivity | | |
| Cream | 4.0 | 6.0 |
| String Gel | 11.0 | 13.0 |
| Tack Free | 17.0 | 16.0 |
| 24 hr K-factor (BTU · in/ft$^2$ · h · ° F.) | 0.133 | 0.125 |

TABLE II-continued

| Catalyst | PC5:/ DMEA | Bismuth Neodecanoate |
|---|---|---|
| Density (pcf) | 2.47 | 2.42 |
| Average Cell Size (microns) | 235 | 217 |

DABCO ® DMEA - a conventional tertiary amine catalyst, i.e., dimethylethanolamine marketed by Air Products and Chemicals, Inc.
DABCO Polycat 5 - a conventional tertiary amine catalyst marketed by Air Products and Chemicals, Inc.
Bismuth NDA - supplied by Shepherd Chemical Company The data in Table II demonstrates the effectiveness of using bismuth neodecanoate in place of the standard amine catalysts (e.g. PC5 and dimethylethanol amine) (DMEA)). Though the reactivity profile remained more or less unchanged, the bismuth catalyst positively impacted both the average cell size and k-factor of the resulting foam. K factor differences of 0.003 or greater are considered statistically significant, thus the bismuth results are substantially improved relative to the tertiary amine control example.

EXAMPLE 3

Effect of Acid in Organometallic Bismuth Catalyzed Polyurethane Flexible Foam

In this example, a polyurethane foam was prepared in a conventional manner substituting various catalyst packages. This experiment evaluated the effect of excess 2-ethylhexanoic acid (2 EHA) on the ability of bismuth tris 2-ethylhexanoic acid (bismuth octoate) to catalyze and produce a flexible polyurethane foam of good quality. The conditions, starting materials and catalytic sites (moles of bismuth) were kept constant throughout these experiments.

Conventional hand-mix techniques were used to prepare the desired 1.9–2.0 pcf density molded flexible foam. Table III lists the physical properties obtained using the various types of catalysts. The control catalyst package consisted of the industrial standard amine package, Dabco 33LV and Dabco BL 11. To compare the effect of excess free acid on a commercial catalyst (Bicat H, 18wt % Bi, 45 wt % free acid) was compared to a low acid bismuth catalyst.

All catalysts were based on CATALYST 1 (28.2wt % Bi, 9 wt % free acid) and diluted with increasing concentrations of 2-EHA. The foams were made in a heated test block mold at 160° F. The catalyst package of Dabco 33LV and BL 11 were used to establish the desired reactivity and foam performance baseline. CATALYST 1, the lowest free acid bismuth octoate, and Polycat 77 were then tested at varying concentrations until the foam reactivity was matched. This was determined by monitoring the extrusion time, which measures the reaction and provides some indication of extent of cure. Once the molar concentration of bismuth (plus a constant amount of Polycat 77) necessary to catalyze the reaction at the same rate as Dabco 33LV and BL 11 was determined, all bismuth catalysts were then tested at equivalent bismuth concentrations and varying free acid concentrations, along with the Polycat 77. The foams tested met standard specifications listed in ASTM D 3453-91 and the tests were performed using ASTM designation D 3574-95.

The polyurethane formulation in parts by weight was:

TABLE III

| Component | Parts by Weight (pphp) |
|---|---|
| Pluracol E-1509 | 75 |
| E 851 | 25 |
| DC 5164 | 0.2 |
| DC 5169 | 0.6 |
| DEOA-LF | 1.4 |
| Dabco BL11 | See table I |
| Dabco 33LV | " |
| Catalyst | " |
| PC77 | " |
| Water | 4.07 |
| TDI 80 | 100 Index |

Pluracol ® E1509 - BASF conventional base triol with a hydroxyl number of approximately 35.
E-851 - Bayer graft copolymer polyol with a hydroxyl number of 28.
DABCO ® DC-5164 - silicone surfactant marketed by Air Products and Chemicals, Inc.
DABCO DC-5169 - silicone surfactant marketed by Air Products and Chemicals, Inc.
DABCO Polycat 77 - a conventional tertiary amine catalyst, i.e., pentamethyldipropylenetriamine, marketed by Air Products and Chemicals, Inc.
DABCO BL 11 - a conventional tertiary amine catalyst, i.e., 70% bis (dimethylaminoethyl)ether in dipropylene glycol, marketed by Air Products and Chemicals, Inc.
DABCO 33 LV - a conventional triethylenediamine catalyst marketed by Air Products and Chemicals, Inc.
BICAT H - Commercial bismuth based catalyst (Bismuth Octoate, 18 wt % Bi)
TDI 80 - a mixture of 80 wt % 2, 4-TDI and 20 wt % 2, 6-TDI

TABLE III

| Catalyst/ use level (php) | 33 LV/ 0.32 BL 11/ 0.08 | BICAT H/ 1.56 PC 77/ 0.32 | CAT 1/ 1.0 PC 77/ 0.32 | CAT 3/ 1.15 PC 77/ 0.32 | CAT 5/ 1.25 PC 77/ 0.32 | CAT 6/ 1.3 PC 77/ 0.32 |
|---|---|---|---|---|---|---|
| Moles Bi added ($10^{-03}$) | 0.0 | 1.35 | 1.35 | 1.35 | 1.35 | 1.35 |
| Wt % Free Acid | 0.0 | 45.0 | 9.0 | 24.0 | 34.0 | 39.0 |
| Mold Reactivity | | | | | | |
| Extrusion time (sec) | 46 | 49 | 48 | 48 | 48 | 49 |
| String Gel (sec) | 63 | 143 | 65 | 66 | 77 | 139 |
| Density (pcf) | 1.88 | FOAM COLLAPSE | 1.94 | 1.89 | 2.01 | FOAM COLLAPSE |
| Airflow (SCFM) | 2.1 | | 1.7 | 1.7 | 1.8 | |
| Compression Set | | | | | | |
| JWS (% ht loss) | 27 | | 34 | 34 | 38 | |
| 50% | 32 | | 30 | 30 | 32 | |
| HACS (% ht loss) | | | | | | |
| Foam Tear Peak Load (N/m) | 10 | | 19 | 20 | 16 | |
| IFD at 25% (lbf) | 32 | | 34 | 35 | 35 | |
| IFD at 65% (lbf) | 84 | | 90 | 90 | 91 | |

TABLE III-continued

| Catalyst/ use level (php) | 33 LV/ 0.32 BL 11/ 0.08 | BICAT H/ 1.56 PC 77/ 0.32 | CAT 1/ 1.0 PC 77/ 0.32 | CAT 3/ 1.15 PC 77/ 0.32 | CAT 5/ 1.25 PC 77/ 0.32 | CAT 6/ 1.3 PC 77/ 0.32 |
|---|---|---|---|---|---|---|
| Return to 25% (lbf) | 26 | | 27 | 27 | 27 | |
| Ball Rebound (%) | 53 | | 53 | 55 | 52 | |

The data in Table III clearly demonstrate how the presence of excess free acid can adversely affect the ability of a metal carboxylate, in this case bismuth octoate, to catalyze and produce an acceptable flexible polyurethane foam. As evident by this data, an excess of greater than 34 wt % free 2-EHA was directly responsible for the failure of the commercial bismuth catalysts Bicat H, and the experimental CATALYST 6 to produce a foam that was acceptable and that could be measured for foam physical properties. The data also demonstrate that physical properties can be maintained, and in some cases, slightly improved over a traditional tertiary amine based catalyst system.

It is interesting that in the production of a flexible or rigid foam vis-à-vis a polyurethane elastomer as described in Article: Proc. SPI Annu. Tech/Mark. Conf. (1989), 32$^{nd}$ (Polyurethanes 89), 623–7, *Bismuth Carboxylates for Polyurethane Catalysts*, that low acid levels in combination with a bismuth carboxyl produce good foams while the use of an high levels, e.g., 47 to 73 wt % free acid (calculations based on this literature's assertion that a sample of bismuth pivalate (bismuth tris-trimethyl acetic acid) performance increases in the presence of 1 to 3 equivalents of excess free acid) significantly improves the rate of reaction, as well as the elastomer physical properties.

EXAMPLE 4

Effect of Neodecanoic Acid (Nda) on Bismuth Tris Neodecanoic Acid in Polyurethane Foam Preparation In this example, a polyurethane foam was prepared in a conventional manner substituting various catalyst packages. This experiment evaluated the effect excess neodecanoic acid (NDA) has on the ability of bismuth tris neodecanoic acid (bismuth NDA) to catalyze and produce a flexible polyurethane foam of good quality. The polyurethane formulation in parts by weight was:

| Component | Parts by Weight (pphp) |
|---|---|
| Pluracol E1509 | 75 |
| E 851 | 25 |
| DC 5164 | 0.2 |
| DC 5169 | 0.6 |
| DEOA-LF | 1.4 |
| Dabco BL 11 | 0.08 |
| Catalyst | See table 2 |
| Water | 4.07 |
| TDI | 100 Index |

Conventional hand-mix techniques were used to make the desired free rise foams. Table IV list the reactivity profile obtained using various types of catalysts. The control catalyst package consisted of the amine package Dabco 33LV and BL 11. To compare the effect of an organometallic catalyst with excess free acid the following experimental catalysts were supplied by Shepherd Chemical Co., LB2174-2, -3, -4, -5, -7 and LB2304-2, -3 were chosen. The foams were made in the standard hand-mix free rise method. The catalyst package of Dabco 33LV and BL 11 were used to establish the desired reactivity and foam performance baseline. Catalyst LB2174-2, the lowest free acid bismuth NDA, was then tested at varying concentrations until the foam reactivity was matched. Dabco BL 11 was kept constant throughout these experiments. Once the molar concentration of bismuth necessary to catalyze the reaction at the same rate as Dabco 33LV and BL 11 was determined, all bismuth catalysts were then tested at equivalent bismuth concentrations and varying free acid concentrations.

TABLE IV

| Catalyst | Dabco 33LV 0.32 parts | 2174-2 2.0 parts | 2174-7 2.0 parts | 2174-5 2.0 parts | 2174-4 2.0 parts | 2174-3 2.0 parts | 2304-3 2.2 parts | 2304-2 2.5 parts |
|---|---|---|---|---|---|---|---|---|
| Moles Bi (10$^{-3}$) | 0.00 | 1.93 | 1.93 | 1.93 | 1.93 | 1.93 | 1.93 | 1.93 |
| Wt % Free Acid | 0.0 | 3.1 | 13.8 | 22.7 | 28.9 | 31.9 | 34.7 | 44.3 |
| Reactivity | | | | | | | | |
| Cup 1 (sec) | 16 | 18 | 19 | 19 | 21 | 22 | 24 | 28 |
| Cup 2 (sec) | 46 | 46 | 47 | 47 | 49 | 52 | 57 | 63 |
| String Gel (sec) | 68 | 71 | 71 | 71 | 73 | 74 | Foam Collapse | Foam Collapse |

TABLE IV-continued

| Catalyst | Dabco 33LV 0.32 parts | 2174-2 2.0 parts | 2174-7 2.0 parts | 2174-5 2.0 parts | 2174-4 2.0 parts | 2174-3 2.0 parts | 2304-3 2.2 parts | 2304-2 2.5 parts |
|---|---|---|---|---|---|---|---|---|
| Full Rise (sec) | 152 | 97 | 96 | 97 | 99 | 98 | | |
| Full Rise (mm) | 413 | 395 | 399 | 396 | 397 | 392 | | |

DABCO ® 33LV—a conventional tertiary amine catalyst marketed by Air Products and Chemicals, Inc.
2174-2 Catalyst supplied by Shepherd Chemical Company (Bismuth NDA, 20.2 wt % Bi)
2174-7—Catalyst supplied by Shepherd Chemical Company (Bismuth NDA, 20.0 wt % Bi)
2174-5—Catalyst supplied by Shepherd Chemical Company (Bismuth NDA, 20.0 wt % Bi)
2174-4—Catalyst supplied by Shepherd Chemical Company (Bismuth NDA, 19.9 wt % Bi)
2174-3—Catalyst supplied by Shepherd Chemical Company (Bismuth NDA, 20.0 wt % Bi)
2304-3—Catalyst supplied by Shepherd Chemical Company (Bismuth NDA, 18.4 wt % Bi)
2304-2—Catalyst supplied by Shepherd Chemical Company (Bismuth NDA, 16.1 wt % Bi)

The data in Table IV clearly demonstrates that the presence of excess free acid can adversely effect the ability of a metal carboxylate, in this case bismuth neodecanoate, to catalyze and produce an acceptable flexible polyurethane foam. The conditions, starting materials and catalytic sites (moles of bismuth) were kept constant throughout these experiments. As evident by this data, an excess of greater than 34.7 wt % free NDA was directly responsible for the failure of the bismuth catalysts, experimental samples 2304-3 and 2304-2, to produce a foam that was acceptable (non-collapsed).

Finally, it should be noted that while a co-catalyst (gelling and/or blowing) is typically used in conjunction with these low acid organometallic catalysts that these products can be used as sole catalysts depending on the properties/reactivity ratio that is desired.

What is claimed is:

1. In a flexible, semi-flexible or rigid polyurethane foam formed by the catalytic reaction of a reaction mixture comprised of an aromatic polyisocyanate, an organometallic catalyst, a polyol and a blowing agent, the improvement which resides in a bismuth carboxylate or bismuth sulfonate having less than 34% free acid as the organometallic catalyst.

2. The flexible, semi-flexible or rigid polyurethane foam of claim 1 wherein the organometallic catalyst is a bismuth carboxylate.

3. The flexible, semi-flexible or rigid polyurethane foam of claim 2 wherein the aromatic polyisocyanate is selected from the group consisting of diphenylmethane diisocyanate and toluenediisocyanate.

4. The flexible, semi-flexible or rigid polyurethane foam of claim 1 wherein the bismuth carboxylate employed in the reaction mixture is in an amount from 0.05 to 5 parts per hundred parts polyol by weight.

5. The flexible, semi-flexible or rigid polyurethane foam of claim 1 wherein the carboxylate is derived from a $C_{5-15}$ aliphatic carboxylic acid.

6. The flexible, semi-flexible or rigid polyurethane foam of claim 5 wherein the carboxylic acid is selected from the group consisting of 2-ethylhexanoic acid and neodecanoic acid.

7. The flexible, semi-flexible or rigid polyurethane foam of claim 6 wherein a tertiary amine catalyst has been included in the reaction mixture.

8. The flexible, semi-flexible or rigid polyurethane foam of claim 7 wherein the ratio of bismuth carboxylate to tertiary amine catalyst is from 1:10 to 10:1 on a weight basis.

9. The flexible, semi-flexible or rigid polyurethane foam of claim 8 wherein the tertiary amine is selected from the consisting of triethylenediamine, pentamethyldipropylenetriamine and bis(dimethylaminoethyl)ether.

10. The flexible, semi-flexible or rigid polyurethane foam of claim 8 wherein the tertiary amine is selected from group consisting of 2-dimethylaminoethyl urea; N,N'-bis(2-dimethylaminoethyl) urea; N,N-bis(2-dimethylaminoethyl) urea; 3-dimethyl-aminopropyl urea; N,N'-bis(3-dimethylaminopropyl) urea; 1-(N-methyl-3-pyrrolidino) methyl urea; 1,3-bis(N-methyl-3-pyrrolidino)-methyl urea; 3-piperidinopropyl urea; N,N'-bis(3-piperidinopropyl) urea; 3-morpholino-propyl urea; N,N'-bis(3-morpholinopropyl) urea; 2-piperidinoethyl urea; N,N'-bis(2-piperidinoethyl) urea; 2-morpholinoethyl urea; and N,N'-bis(2-morpholinoethyl) urea.

11. The flexible, semi-flexible or rigid polyurethane foam of claim 8 wherein the tertiary amine is selected from the group consisting of 3-dimethyl-aminopropyl urea; N,N'-bis (3-dimethylaminopropyl) urea; and 1-(N-methyl-3-pyrrolidino)methyl urea.

12. In a process for producing a flexible, semi-flexible or rigid polyurethane foam by the catalytic reaction of a reaction mixture comprised of an aromatic polyisocyanate, an organometallic catalyst, a polyol and a blowing agent, the improvement which resides in employing a bismuth carboxylate or bismuth sulfonate having less than 34% free acid as the organometallic catalyst.

13. The process for producing the flexible, semi-flexible or rigid polyurethane foam of claim 12 wherein the organometallic catalyst employed is a bismuth carboxylate.

14. The process for producing the flexible, semi-flexible or rigid polyurethane foam of claim 13 wherein the aromatic polyisocyanate is selected from the group consisting of diphenylmethane diisocyanate and toluenediisocyanate.

15. The process for producing the flexible, semi-flexible or rigid polyurethane foam of claim 14 wherein the bismuth carboxylate is employed in an amount from 0.05 to 5 parts per hundred parts polyol by weight.

16. The process for producing the flexible, semi-flexible or rigid polyurethane foam of claim 15 wherein the bismuth carboxylate is derived from a $C_{5-15}$ aliphatic carboxylic acid.

17. The process for producing the flexible, semi-flexible or rigid polyurethane foam of claim 16 wherein the carboxylic acid is selected from the group consisting of 2-ethylhexanoic acid and neodecanoic acid.

18. The process for producing the flexible, semi-flexible or rigid polyurethane foam of claim 17 wherein a tertiary amine catalyst has been employed in the reaction mixture.

19. The process for producing the flexible, semi-flexible or rigid polyurethane foam of claim 18 wherein the ratio of bismuth carboxylate to tertiary amine catalyst is from 1:10 to 10:1 on a weight basis.

20. The process for producing the flexible, semi-flexible or rigid polyurethane foam of claim 19 wherein the tertiary amine is selected from the group consisting of triethylenediamine, pentamethyldipropylenetriamine and bis(dimethylaminoethyl)ether.

21. The flexible, semi-flexible or rigid polyurethane foam of claim 18 wherein the tertiary amine is selected from group consisting of 2-dimethylaminoethyl urea; N,N'-bis(2-dimethylaminoethyl) urea; N,N-bis(2-dimethylaminoethyl) urea; 3-dimethyl-aminopropyl urea; N,N'-bis(3-dimethylaminopropyl) urea; 1-(N-methyl-3-pyrrolidino) methyl urea; 1,3-bis(N-methyl-3-pyrrolidino)-methyl urea; 3-piperidinopropyl urea; N,N'-bis(3-piperidinopropyl) urea; 3-morpholino-propyl urea; N,N'-bis(3-morpholinopropyl) urea; 2-piperidinoethyl urea; N,N'-bis(2-piperidinoethyl) urea; 2-morpholinoethyl urea; and N,N'-bis(2-morpholinoethyl urea.

22. The flexible, semi-flexible or rigid polyurethane foam of claim 21 wherein the tertiary amine is selected from the group consisting of 3-dimethyl-aminopropyl urea; N,N'-bis (3-dimethylaminopropyl) urea; and 1-(N-methyl-3-pyrrolidino)methyl urea.

* * * * *